(12) United States Patent
Yach et al.

(10) Patent No.: US 8,745,526 B2
(45) Date of Patent: Jun. 3, 2014

(54) SCREEN DISPLAY IN APPLICATION SWITCHING

(75) Inventors: David Yach, Waterloo (CA); Gerhard Dietrich Klassen, Waterloo (CA)

(73) Assignee: Blackberry Limited, Waterloo (CA)

( * ) Notice: Subject to any disclaimer, the term of this patent is extended or adjusted under 35 U.S.C. 154(b) by 590 days.

(21) Appl. No.: 11/374,067

(22) Filed: Mar. 14, 2006

(65) Prior Publication Data

US 2007/0220445 A1 Sep. 20, 2007

(51) Int. Cl.
*G06F 3/048* (2013.01)
*G06F 3/0481* (2013.01)

(52) U.S. Cl.
CPC .................................. *G06F 3/0481* (2013.01)
USPC ............................ 715/790; 715/835; 345/574

(58) Field of Classification Search
CPC .... G06F 3/048; G06F 3/0481; G06F 3/14717
USPC .......... 715/790, 791, 797, 835; 345/592, 638, 345/555, 690
See application file for complete search history.

(56) References Cited

U.S. PATENT DOCUMENTS

| | | | | |
|---|---|---|---|---|
| 5,463,726 A | * | 10/1995 | Price | 715/797 |
| 5,554,980 A | * | 9/1996 | Hashimoto et al. | 345/158 |
| 5,949,418 A | | 9/1999 | Shields et al. | |
| 6,760,048 B1 | * | 7/2004 | Bates et al. | 715/797 |
| 2002/0026474 A1 | | 2/2002 | Wang | |
| 2003/0117440 A1 | * | 6/2003 | Hellyar et al. | 345/767 |
| 2004/0254816 A1 | * | 12/2004 | Myers | 705/2 |
| 2005/0143137 A1 | * | 6/2005 | Matsunaga et al. | 455/566 |
| 2006/0161847 A1 | * | 7/2006 | Holecek et al. | 715/716 |

FOREIGN PATENT DOCUMENTS

| | | |
|---|---|---|
| EP | 0422577 | 4/1991 |
| EP | 1189131 | 3/2002 |
| EP | 1251515 | 10/2002 |
| JP | 2002196867 A | * 7/2002 |

OTHER PUBLICATIONS

Jeff Atwood, "ALT+TAB Extreme" Oct. 8, 2005.*
Philip Haine "Bring related windows forward during Alt-Tab" Feb. 22, 2006.*
Lincoln et al.; Displaying Scientific graphic on computer; © 1997; IEEE; 14 pages.*
Haine; Bring related windows forward during Alt-Tab; published on 2009; http://stealthisidea.com/articles/alt-tab-tweak; 9 pages.*
Narayanaswami et al.; Application design for a smart watch with a high resolution display; © 2000; IEEE; 8 pages.*
Bravo, Piero, Second Exam Report for EP06111131.6, Feb. 8, 2008.
Bravo, Piero, First Exam Report for EP06111131.6, Oct. 18, 2006.
Bravo, Piero, Extended European Search Report for EP06111131.6, May 23, 2006.

(Continued)

*Primary Examiner* — Linh K Pham
(74) *Attorney, Agent, or Firm* — Ridout & Maybee LLP

(57) ABSTRACT

An application-switching program displays representations of applications, for example icons, on a screen of a device. As a user of the device navigates between the representations, a screen of the application to a representation of which the user has currently navigated is shown in the background of the display.

13 Claims, 9 Drawing Sheets

(56) References Cited

OTHER PUBLICATIONS

Bravo, Piero, Fourth, Exam Report for EP 06111131.6, Aug. 24, 2010.

Linco, Reginald, Second Office Action for CA 2,581,628, May 17, 2011.

Linco, Reginald, First Office Action for CA 2,581,628, Jan. 14, 2010.

* cited by examiner

SCREEN DISPLAY IN APPLICATION SWITCHING

BACKGROUND

A device may have two or more applications running concurrently. For example, a user of a personal digital assistant (PDA) may activate an e-mail application, a calendar application, an instant messaging (IM) application and the "home page" of the PDA. The display of a PDA is small, so usually only one of the running applications has its screen shown on the display at any given time. The device may have a task-switching program to enable a user to select which application has its screen shown on the display.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

According to embodiments of the invention, an application-switching program may display representations of applications, for example icons, on a screen of a device.

As a user of the device navigates between the representations, a screen of the application to a representation of which the user has currently navigated is shown in the background of the display. Showing the screen in the background of the display provides additional feedback to the user regarding the navigation and may assist the user in deciding whether to switch to that application. It also enables the user to monitor the application to a representation of which the user has currently navigated without switching to the application.

An appropriate location in the display for the representations may be determined. For example, the location may be fixed at the center of the display. Alternatively, the location may be determined so as to lessen the amount of information in the screen that is obscured by the representations. Alternatively, if certain areas of the screen are more important than others, the location may be determined so as to reduce the amount of those important areas that is obscured by the representations.

Figure 1:
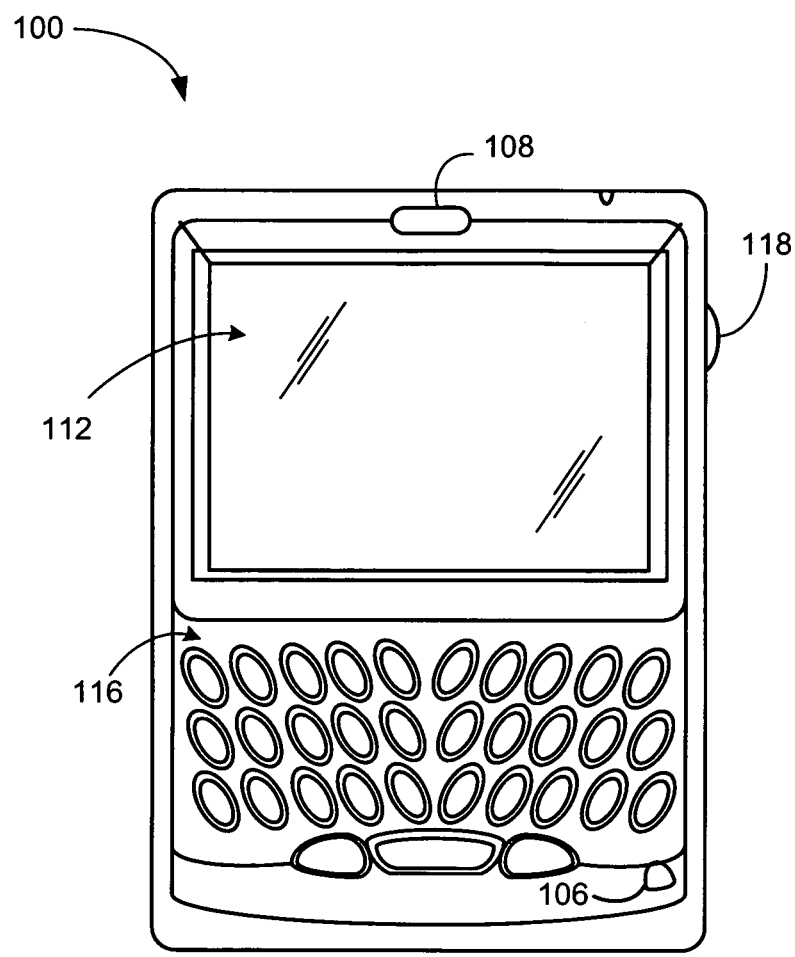
FIG. 1 is an illustration of an exemplary device, according to some embodiments.
Figure 2:
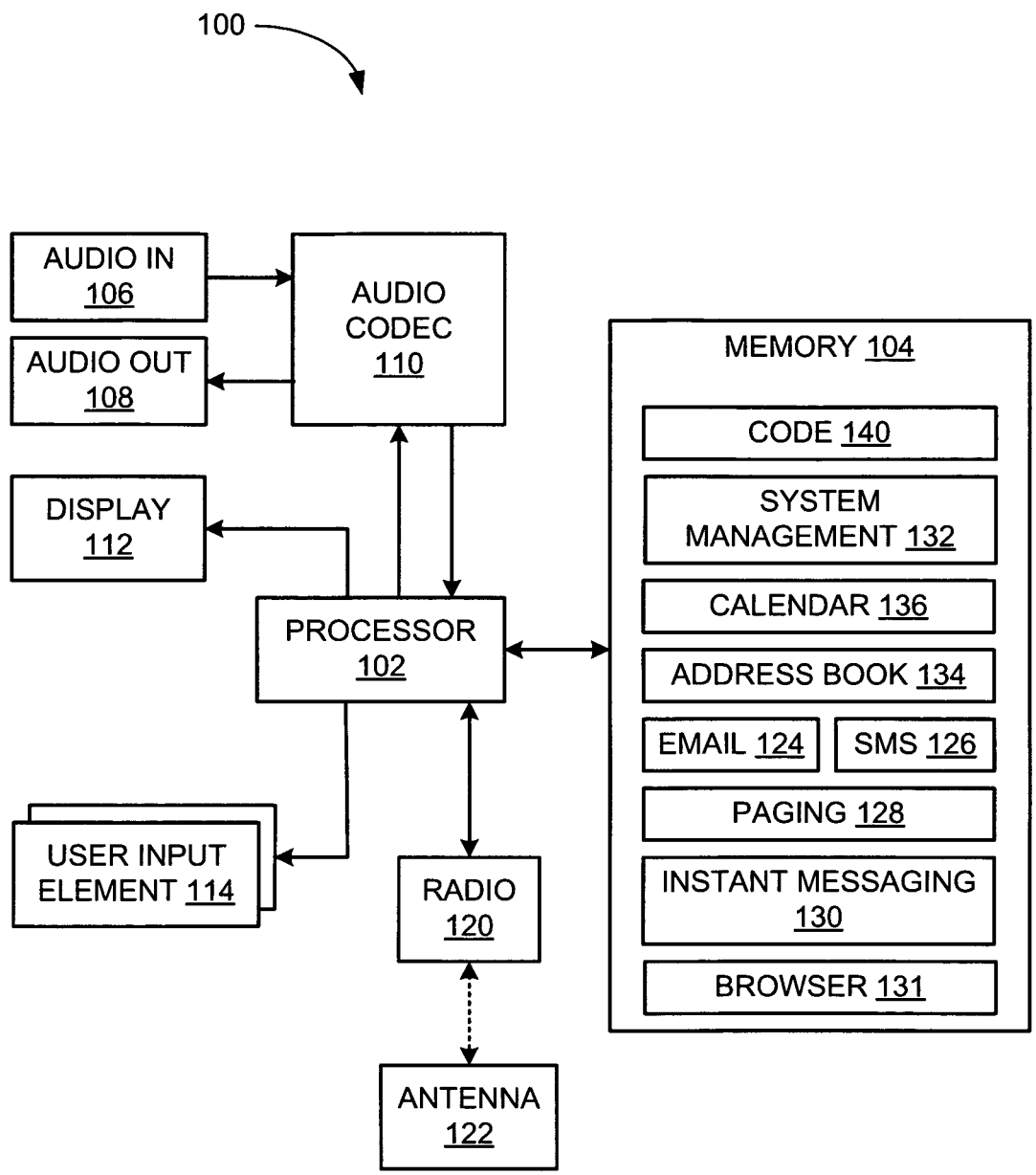
FIG. 2 is a block diagram of an exemplary device, according to some embodiments.

Reference is made now to FIGS. 1 and 2. FIG. 1 is an illustration of an exemplary device 100, according to some embodiments, and FIG. 2 is a block diagram of device 100, according to some embodiments. For clarity, some components and features of device 100 are not shown in FIGS. 1 and 2 and are not described explicitly below.

Device 100 includes a processor 102 and a memory 104 coupled to processor 102. Device 100 includes an audio input element 106, for example a microphone, an audio output element 108, for example, a speaker, and an audio coder-decoder (codec) 110, however, embodiments of the invention are also applicable to devices without these audio components.

Device 100 includes a display 112 coupled to processor 102. Device 100 also includes one or more user input elements 114 coupled to processor 102, for example, a keyboard 116 and a thumbwheel 118. Device 100 may include additional user input and/or output elements that are not shown in FIG. 1, for example a trackball. Keyboard 116 may be embedded in full or in part within display 112, i.e. display 112 may be a touch screen.

Device 100 includes a radio 120, compatible with one or more wireless communication standards, coupled to processor 102 and an antenna 122 coupled to radio 120. By way of radio 120, antenna 122 and a communication infrastructure (not shown) that is external to device 100, device 100 may be able to establish telephone and/or data communication sessions with other systems (not shown). However, embodiments of the invention are also applicable to devices without these wireless communication components.

Data communication sessions may include data in the form of plain text, data files, voice files, image files, movie files, streaming audio, streaming video, animation, or any other suitable data form. A non-exhaustive list of examples for data communication sessions includes sending and receiving electronic mail (e-mail), sending and receiving instant messages, sending and receiving paging messages, sending and receiving short message service (SMS) messages, and any other suitable data communication sessions. For data communications supported by device 100, memory 104 may store respective application modules to be executed by processor 102, for example, an e-mail application module 124, an SMS application module 126, a paging application module 128, an instant messaging application module 130, and a web browser application module 131.

Memory 104 stores a system management application module 132 and may optionally store other application modules, for example, an address book or contacts application module 134 and a calendar application module 136.

These application modules are just examples and embodiments of the invention are also applicable to devices with a different set of application modules.

For the purpose of the description and the claims, several terms are defined hereinbelow: a) an application is considered "running" if system management application module 132 or a user of device 100 previously selected that application for execution, and execution of that application is not yet terminated; and b) an application is considered "active" if it is running and a screen associated with that application is displayed on display 112. System management application module 132 may be considered running at all times.

According to some embodiments, memory 104 may store executable code 140 which, when executed by processor 102, enables a user to switch between applications running on device 100. The application to which a user has switched will have at least one of its screens shown in display 112.

Figure 3:
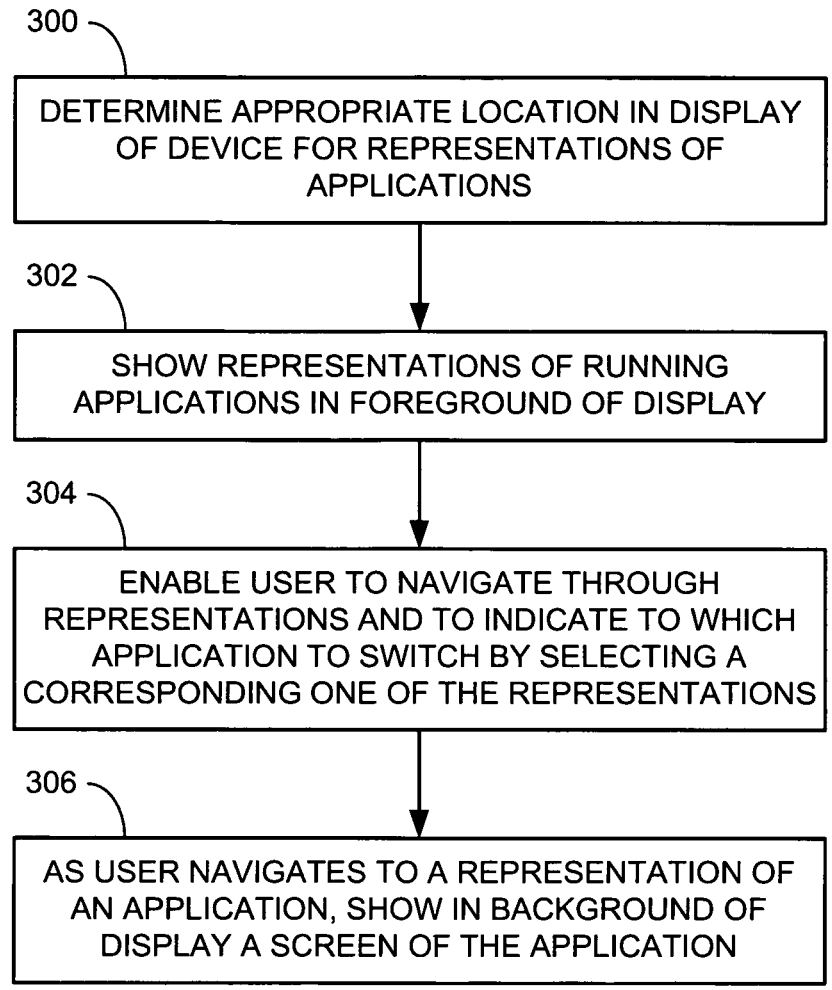
FIG. 3 is a flowchart of an exemplary method implemented by an instant messaging client on a device, according to some embodiments.

FIG. 3 is a flowchart of an exemplary method to be implemented by code 140, according to some embodiments.

At 300, an appropriate location in display 112 for representations of running applications may be determined. For example, the location may be fixed at the center of display 112. Alternatively, the location may be determined so as to reduce the amount of information in the screen that is obscured by the representations. Alternatively, if certain areas of the screen are more important than others, the location may be determined so as to reduce the amount of those important areas that is obscured by the representations.

At 302, representations of running applications are shown in the foreground of display 112.

At 304, navigation through the representations by a user of device 100 is enabled. The user uses at least one user input element 114 to navigate through the representations. Using at least one user input element 114, the user may indicate to device 100 to which application to switch by selecting a corresponding one of the representations. For example, the user may navigate through the representations by rolling thumbwheel 118 and may select a representation by activating a tactile switching action of thumbwheel 118.

At 306, as the user navigates, a screen of the application to a representation of which the user has currently navigated is shown in the background of display 112.

Figure 4:
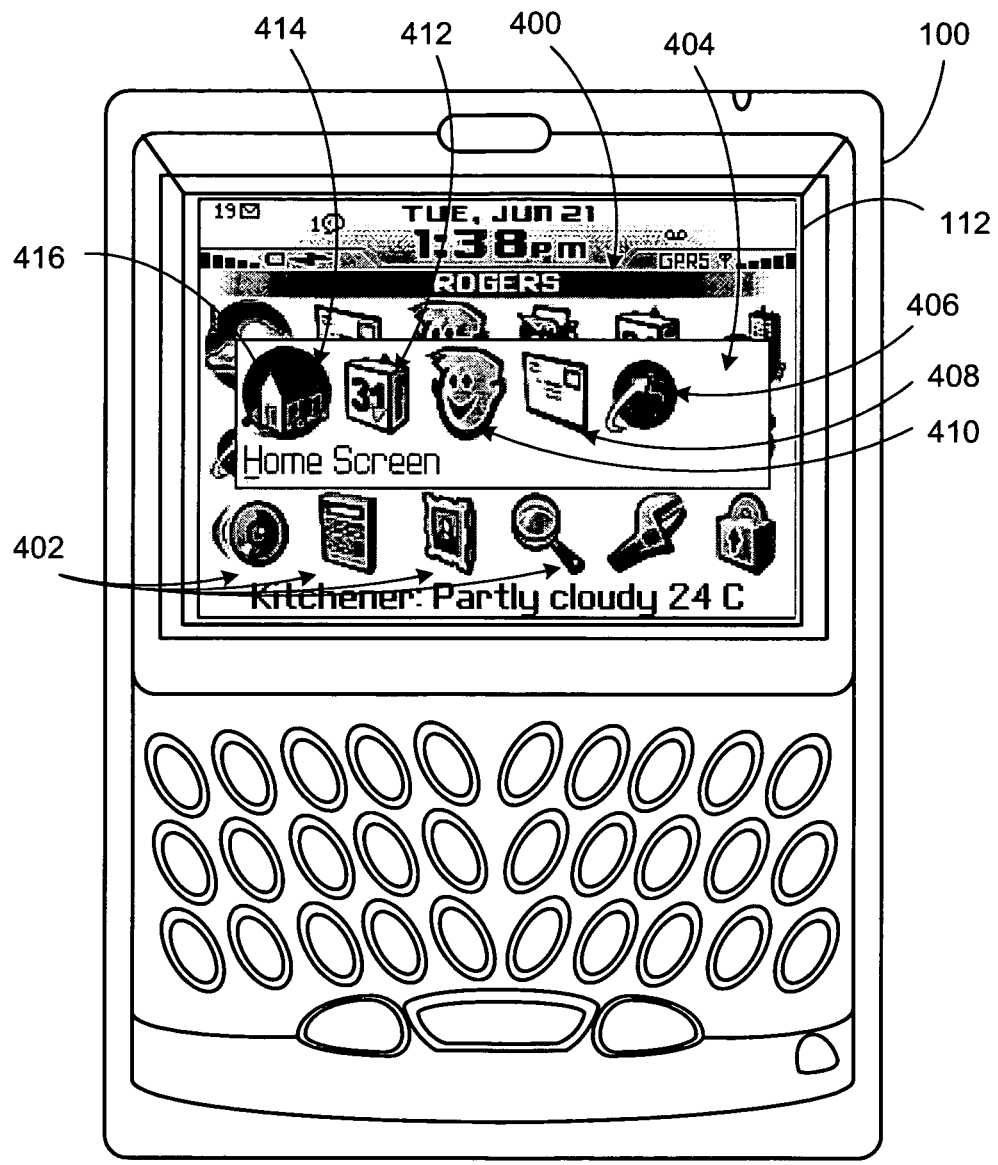
FIGS. 4-9 are illustrations of an exemplary device and its display, according to some embodiments.

FIG. 4 illustrates an exemplary screen 400 shown on display 112. Screen 400 is referred to as a "Home screen" and is associated with system management application module 132. The home screen includes representations 402 of application modules that are stored in memory 104.

In response to an input previously received from a user of device 100, a subscreen 404 is shown in the foreground of display 112, thereby obscuring a portion of screen 400. Subscreen 404 includes representations 406, 408, 410, 412 and 414 of applications that are running on device 100, namely application modules 132, 136, 130, 124 and 131, respectively. In this example the representations are icons, however, other suitable representations such as text are also possible.

A user of device 100 may navigate through representations 406, 408, 410, 412 and 414, and may indicate to device 100 to which of the applications to switch by selecting a corresponding one of the representations. During navigation, the representation to which the user has navigated is emphasized in subscreen 404 with respect to the others. In FIG. 4, representation 414 of the home screen is emphasized by a solid circle 416 around it and display of the caption "Home Screen".

Figure 5:
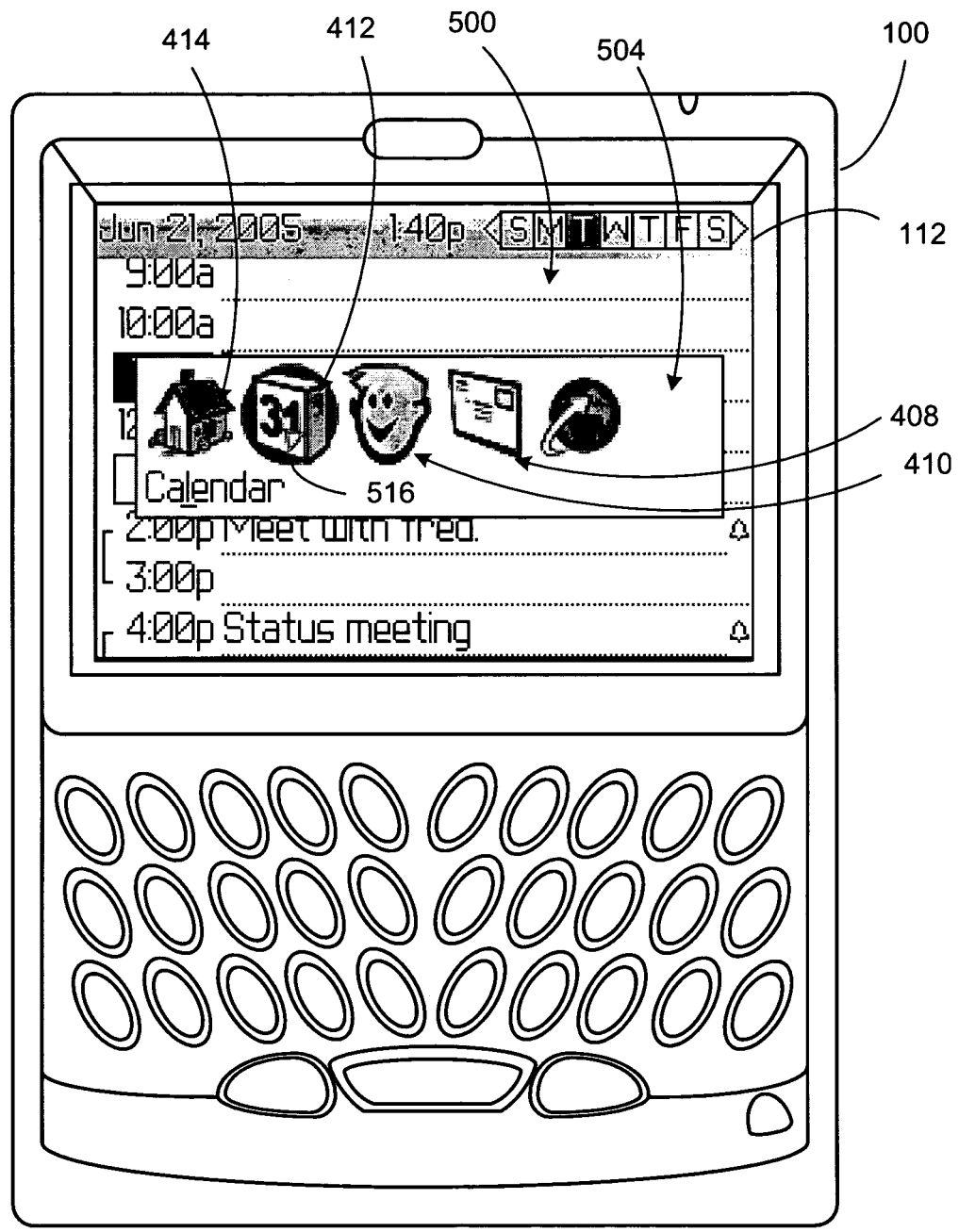

The user may navigate from representation 414 to representation 412 of calendar application module 136. As shown in FIG. 5, an exemplary screen 500 of calendar application module 136 is shown in the background of display 112, while a subscreen 504 is shown in the foreground of display 112. Subscreen 504 differs from subscreen 404 in that representation 414 is not emphasized and representation 412 is emphasized by a solid circle 516 around it and display of the caption "Calendar".

Figure 6:
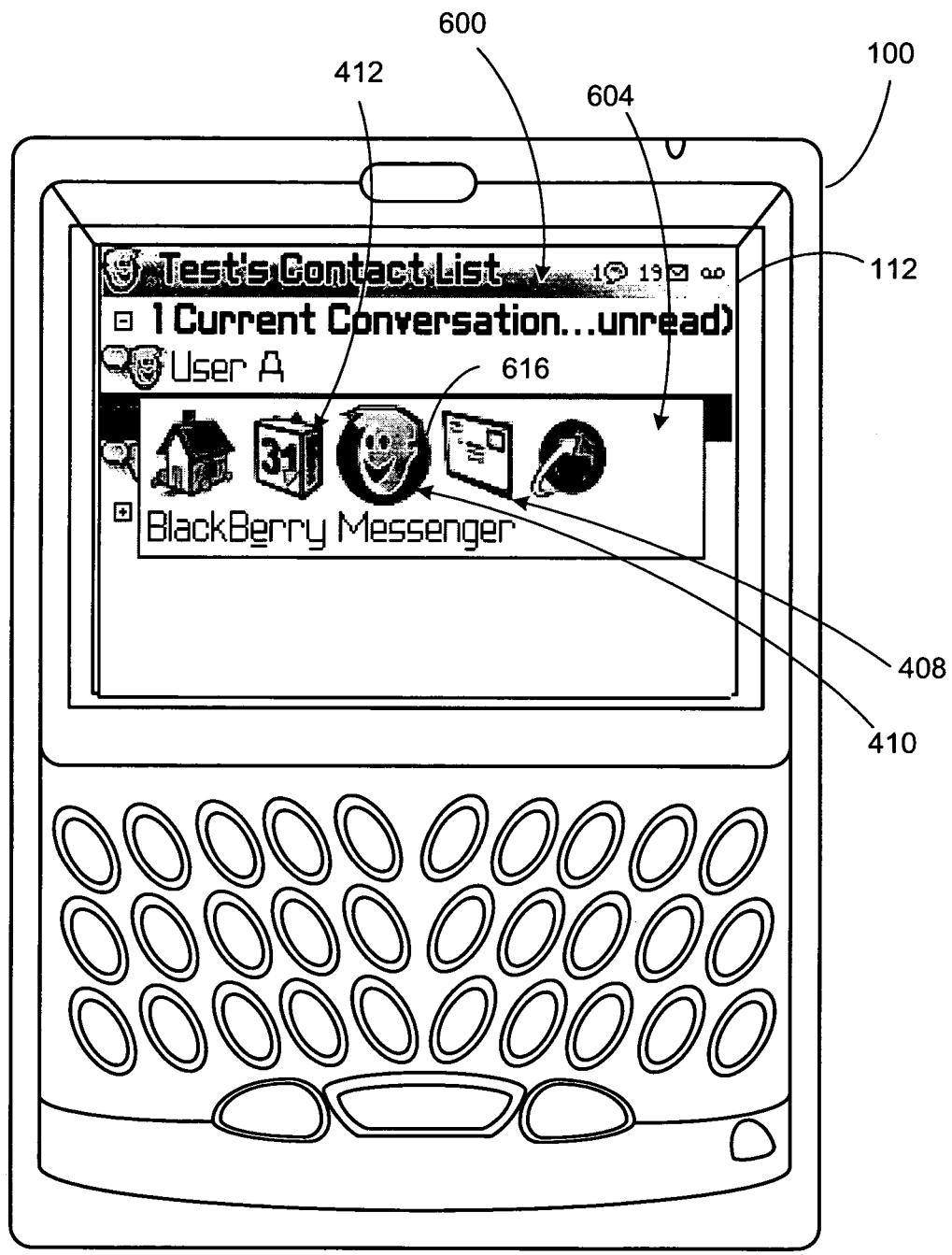

The user may continue to navigate from representation 412 to representation 410 of instant messaging application module 130. As shown in FIG. 6, an exemplary screen 600 of instant messaging application module 130 is shown in the background of display 112, while a subscreen 604 is shown in the foreground of display 112. Subscreen 604 differs from subscreen 504 in that representation 412 is not emphasized and representation 410 is emphasized by a solid circle 616 around it and display of the caption "BlackBerry Messenger".

Figure 7:
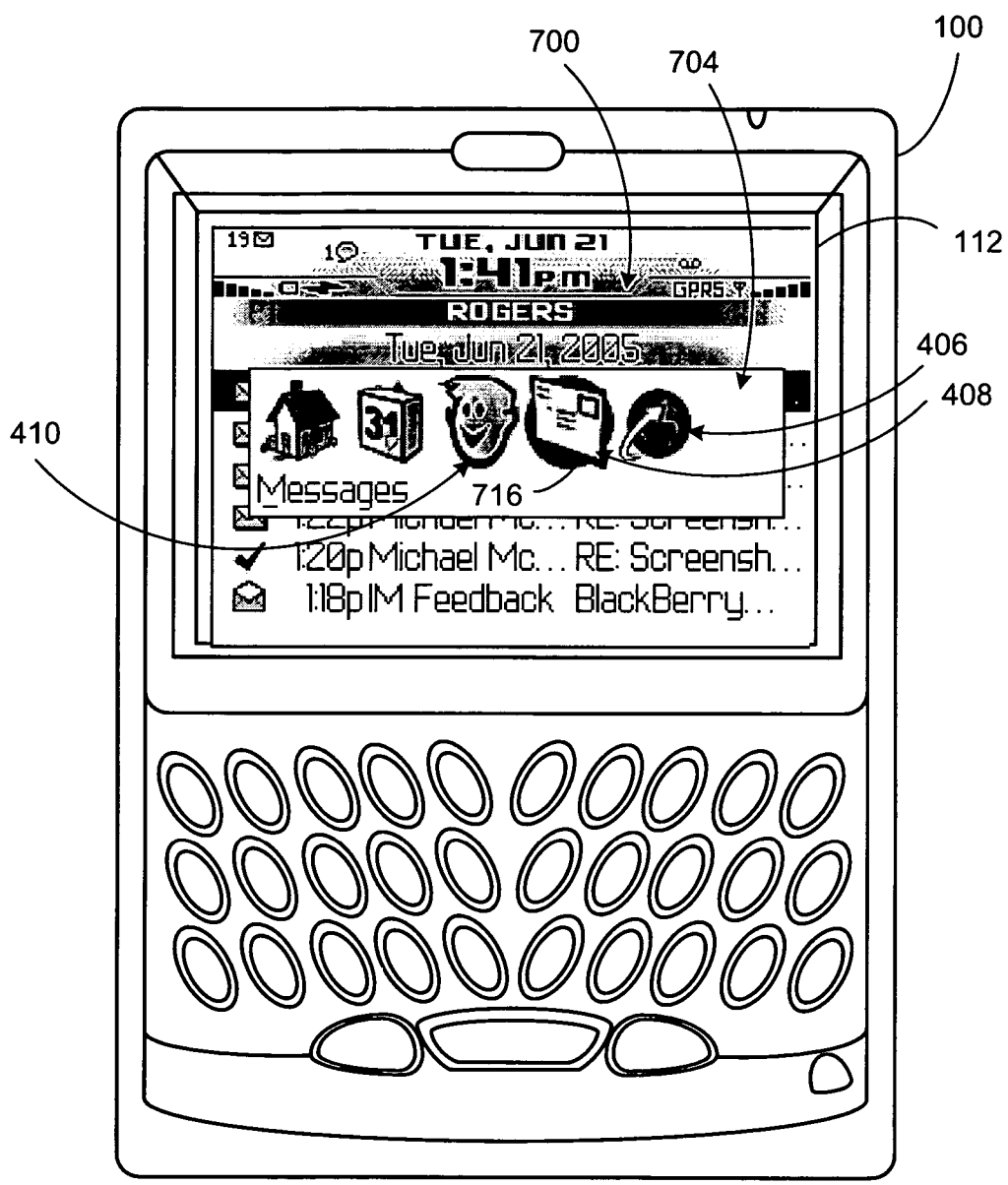

The user may continue to navigate from representation 410 to representation 408 of e-mail application module 124. As shown in FIG. 7, an exemplary screen 700 of e-mail application module 124 is shown in the background of display 112, while a subscreen 704 is shown in the foreground of display 112. Subscreen 704 differs from subscreen 604 in that representation 410 is not emphasized and representation 408 is emphasized by a solid circle 716 around it and display of the caption "Messages".

Figure 8:
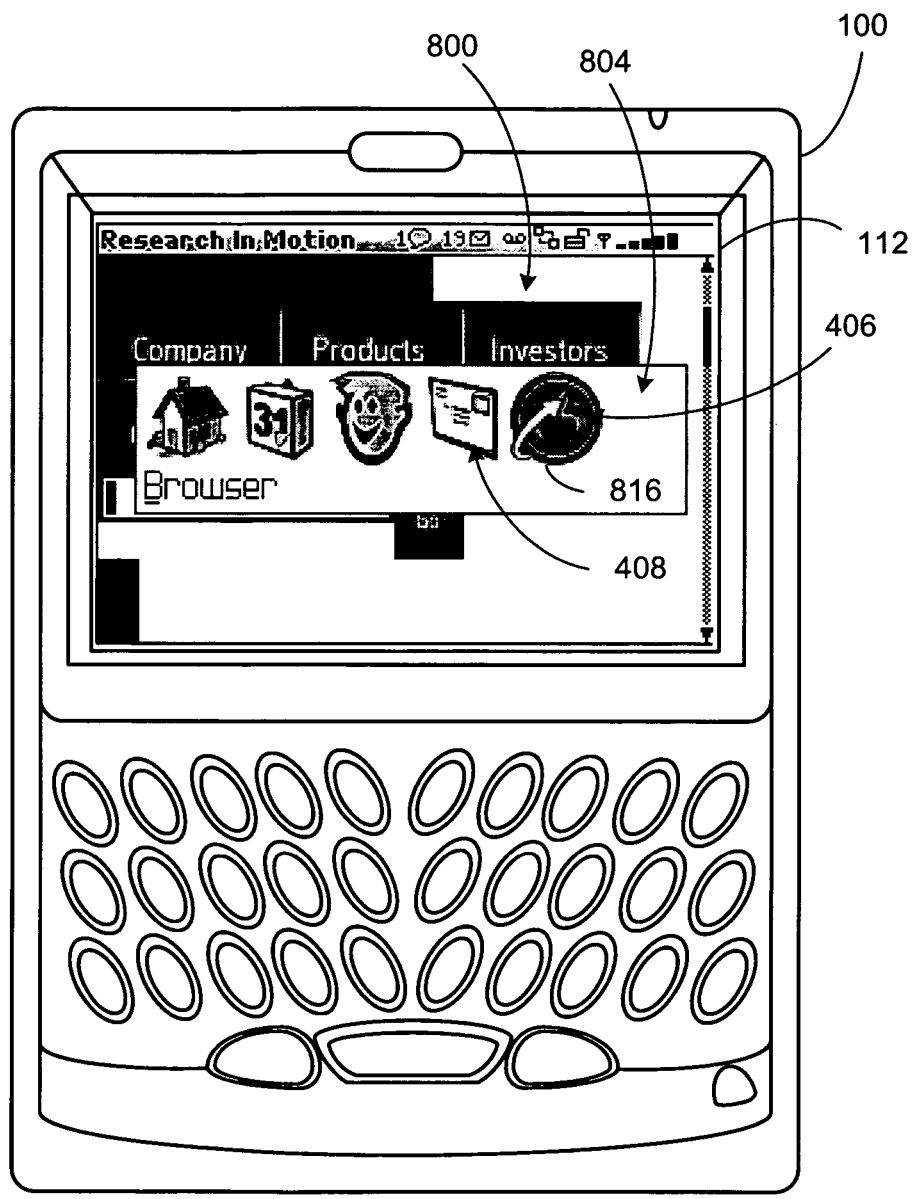

The user may continue to navigate from representation 408 to representation 406 of web browser application module 131. As shown in FIG. 8, an exemplary screen 800 of web browser application module 131 is shown in the background of display 112, while a subscreen 804 is shown in the foreground of display 112. Subscreen 804 differs from subscreen 704 in that representation 408 is not emphasized and representation 406 is emphasized by a solid circle 816 around it and display of the caption "Browser".

Figure 9:
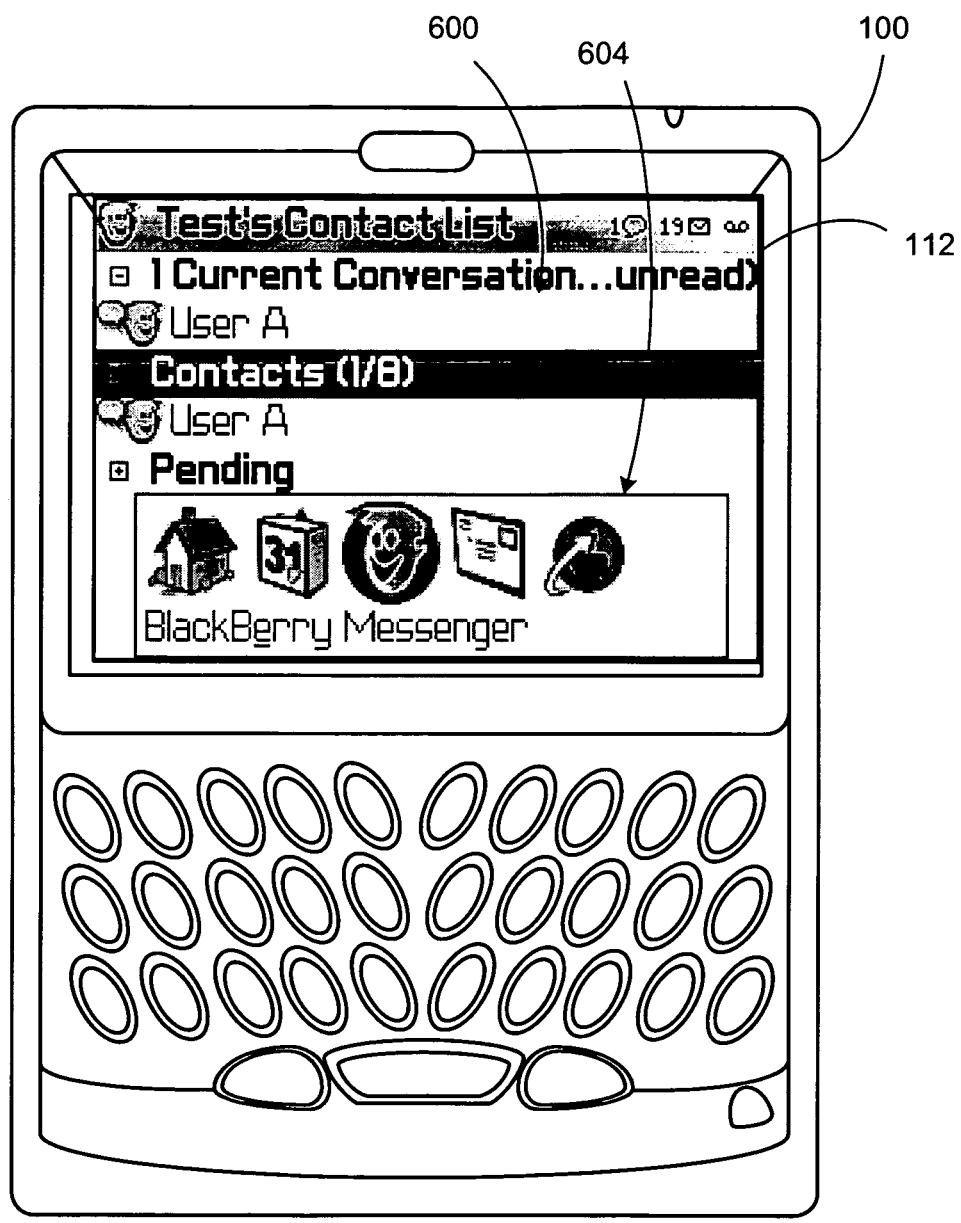

The location of subscreens 404, 504, 604, 704 and 804 in display 112 obscures useful information in screens 400, 500, 600, 700 and 800, respectively. Therefore, a more appropriate location for the representations of the running applications may be as shown in FIG. 9, in which subscreen 604 is placed so as to lessen the amount of information in screen 600 that is obscured by the representations in subscreen 604. Subscreens 404, 504, 604, 704 and 804 may be moved in different locations of the screen, for example, top, middle, bottom. The location of the subscreens may be defined by the user using Cartesian coordinates of the screen, or may be pre-selected by the user from a set of options such as top, middle and bottom.

Subscreens 404, 504, 604, 704 and 804 show the representations in a single horizontal row, but more than one horizontal row is also possible. Likewise, one or more vertical columns of representations is also possible, and such subscreens may be located to the left, middle or right of the screen.

Various techniques or a combination thereof may be used to distinguish the subscreens in the foreground of the display from the screens in the background of the display. One such technique is to use a larger or smaller font size for the captions in the subscreens than that used in the screens. Another such technique is to have different colors for the icons in the subscreens than the colors of the icons in the screens. Yet another technique is to generate different sounds as the user navigates from one representation to another in the subscreens than the sounds generated as the user navigates in a screen.

Subscreens 404, 504, 604, 704 and 804 will disappear from display 112 once the user has selected a representation to indicate to which application to switch to.

A non-exhaustive list of examples for communication protocols with which radio 120 may comply includes Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

Alternatively, device 100 may be "IEEE 802.11-enabled", which means that radio 120 may comply with one or more of the 802.11 family of standards defined by the Institute of Electrical and Electronic Engineers (IEEE) for Wireless Local Area Network (LAN) Medium Access Control (MAC) and Physical layer (PHY) specifications, other existing WLAN standards or future related standards.

A non-exhaustive list of examples for device 100 includes a cellular phone, a smart phone, a personal digital assistant (PDA), an electronic mail (Email) client, a gaming device, a laptop computer, a notebook computer, a wireless terminal, and any other suitable mobile apparatus.

A non-exhaustive list of examples for processor 102 includes microprocessors, microcontrollers, central processing units (CPU), digital signal processors (DSP), reduced instruction set computers (RISC), complex instruction set computers (CISC) and the like. Furthermore, processor 102 may comprise more than one processing unit, may be part of an application specific integrated circuit (ASIC) or may be a part of an application specific standard product (ASSP).

A non-exhaustive list of examples for memory 104 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 122 includes dipole antennae, monopole antennae, multilayer ceramic antennae, planar inverted-F antennae, loop antennae, shot antennae, dual antennae, omnidirectional antennae and any other suitable antennae.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing information about multiple applications running concurrently on a device having a display, the method comprising:

while a screen of a first application of the multiple applications is shown in the display, showing in the display a subscreen that includes precisely one representation for each of the multiple applications and enabling navigation through the representations without indicating to which application to switch, wherein the subscreen is smaller than the screen of the first application and obscures a portion of the screen of the first application; and in response to navigation to a representation of a second application of the multiple applications without switching to the second application, ceasing to show in the display the screen of the first application and instead showing in the display a screen of the second application; wherein the subscreen obscures a portion of the screen of the second application, wherein the subscreen is smaller than the screen of the second application.

2. The method of claim 1, wherein showing the subscreen comprises:

determining a location for the subscreen in the display to reduce the amount of information in the screen of the first application that is obscured by the subscreen; and showing the subscreen in the display at the location.

3. The method of claim 1, wherein showing the subscreen comprises:

determining a location for the subscreen in the display to reduce the amount of information obscured by the subscreen in areas of the screen of the first application that are more important than other areas of the screen of the first application; and showing the subscreen in the display at the location.

4. The method of claim 1, wherein the representations are icons and the method further comprises:

in response to navigation to an icon of the second application, showing in the subscreen a caption for the icon.

5. The method of claim 1, further comprising; in response to selection of the representation as an indication to switch to the second application, showing the portion of the screen of the second application instead of the subscreen, wherein the screen of the second application is shown in its entirety in the display.

6. The method of claim 1, wherein one of the first application and the second application is a system management application and the screen of the system management application is a home screen.

7. A device comprising:

a processor configure to run multiple applications concurrently; a display coupled to the processor, the display able to show a screen of a first application of the multiple applications and, while the screen is shown in the display, to show a subscreen that includes precisely one representation for each of the multiple applications, wherein the subscreen is smaller than the screen of the first application and obscures a portion of the screen of the first application;

a user input element coupled to the processor, the user input element to enable navigation through the representations without indicating to which application to switch; and a memory coupled to the processor, the memory to store code which, when executed by the processor and in response to navigation to a representation of a second application of the multiple applications without switching to the second application, ceases to show in the display the screen of the first application and instead shows in the display a screen of the second application, wherein the subscreen obscures a portion of the screen of the second application, wherein the subscreen is smaller than the screen of the second application.

8. The device of claim 7, wherein the code, when executed by the processor, determines a location for the subscreen in the display to reduce the amount of information in the screen of the first application that is obscured by the subscreen.

9. The device of claim 7, wherein the code, when executed by the processor, determines a location for the subscreen in the display to reduce the amount of information that is obscured by the subscreen in areas of the screen of the first application that are more important than other areas of the screen of the first application.

10. The device of claim 7, wherein the user input element is a keyboard.

11. The device of claim 7, wherein the user input element is a thumbwheel.

12. The device of claim 7, wherein the user input element is a trackball.

13. The device of claim 7, wherein the representations are icons.

* * * * *